(12) United States Patent
Irish et al.

(10) Patent No.: US 7,539,840 B2
(45) Date of Patent: May 26, 2009

(54) HANDLING CONCURRENT ADDRESS TRANSLATION CACHE MISSES AND HITS UNDER THOSE MISSES WHILE MAINTAINING COMMAND ORDER

(75) Inventors: John D. Irish, Rochester, MN (US); Chad B. McBride, Rochester, MN (US); Ibrahim A. Ouda, Rochester, MN (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 11/420,884

(22) Filed: May 30, 2006

(65) Prior Publication Data

US 2007/0283121 A1    Dec. 6, 2007

(51) Int. Cl.
*G06F 12/00* (2006.01)
(52) U.S. Cl. .................................. 711/202; 711/118
(58) Field of Classification Search .................. 711/202, 711/118
See application file for complete search history.

(56) References Cited

U.S. PATENT DOCUMENTS

| 5,418,922 | A  | * | 5/1995  | Liu .............................. 711/3 |
| 2003/0084273 | A1 | * | 5/2003  | Moore ....................... 712/227 |
| 2004/0215921 | A1 | * | 10/2004 | Alexander et al. .......... 711/216 |

* cited by examiner

*Primary Examiner*—Hyung Sough
*Assistant Examiner*—Mardochee Chery
(74) *Attorney, Agent, or Firm*—Joan Pennington

(57) ABSTRACT

A method handles concurrent address translation cache misses and hits under those misses while maintaining command order based upon virtual channel. Commands are stored in a command processing unit that maintains ordering of the commands. A command buffer index is assigned to each address being sent from the command processing unit to an address translation unit. When an address translation cache miss occurs, a memory fetch request is sent. The CBI is passed back to the command processing unit with a signal to indicate that the fetch request has completed. The command processing unit uses the CBI to locate the command and address to be reissued to the address translation unit.

6 Claims, 2 Drawing Sheets

HANDLING CONCURRENT ADDRESS TRANSLATION CACHE MISSES AND HITS UNDER THOSE MISSES WHILE MAINTAINING COMMAND ORDER

FIELD OF THE INVENTION

The present invention relates generally to the data processing field, and more particularly, relates to a method and apparatus for handling concurrent address translation cache misses and hits under those misses while maintaining command order when architecturally required.

DESCRIPTION OF THE RELATED ART

Load and store commands in an input/output (I/O) subsystem target multiple sources and destinations, respectively. A virtual channel number distinguishes these targets. All commands that share a virtual channel number are required to maintain a user defined order which may range from relaxed to strict ordering. The ordering policy is not known until after address translation is complete so it is assumed that a strict ordering policy is used through the translation process, which means all commands must complete in the order that the command is issued within a virtual channel. Commands with different virtual channels can complete in a different order or can pass each other.

Incoming load and store commands signal to the I/O interface a virtual address, which corresponds to that I/O device's view of memory. This virtual address needs to be translated into a real address corresponding to the processor's view of the memory map.

Typically an address translation cache is used, as part of the translation process, to take advantage of the temporal and spacial locality of the I/O command addressing. In a system where the address translation unit uses a cache to hold the translation table entries, a cache miss will affect the command flow due to the added time required for performing a memory fetch and then re-translation of the address of the corresponding command.

Ideally, the translation unit continues to enable translations to occur while a cache miss is being handled. This is referred to as hits under a miss for those commands that have translation table hits.

Some known arrangements only allow one miss at a time while allowing multiple hits under that miss. This solution is not generally effective since it fails to take advantage of the memory fetch pipeline, which allows multiple memory fetches in process at a time.

A need exists for an effective mechanism that allows handling concurrent misses where another translation cache miss occurs under the current translation cache miss and then to continue allowing translations under multiple misses. A need exists for such mechanism that enables maintaining command order based upon virtual channel and that prevents a single virtual channel from consuming all of the miss handling resources.

SUMMARY OF THE INVENTION

A principal aspect of the present invention is to provide a method for handling concurrent address translation cache misses and hits under those misses while maintaining command order based upon virtual channel (VC). Other important aspects of the present invention are to provide such method for handling concurrent address translation cache misses and hits under those misses while maintaining command order based upon virtual channel substantially without negative effect and that overcome many of the disadvantages of prior art arrangements.

In brief, a method is provided for handling concurrent address translation cache misses and hits under those misses while maintaining command order based upon virtual channel. Commands are stored in an input command queue in a command processing unit maintaining ordering of the commands. A command buffer index (CBI) is assigned to each address being sent from the command processing unit to an address translation unit. When an address translation cache miss occurs, a memory fetch request is sent. When the cache table entry is loaded into the cache, the CBI is passed back to the command processing unit with a signal to indicate that the fetch request has completed. The command processing unit uses the CBI to locate the command and address to be reissued to the address translation unit.

In accordance with features of the invention, the CBI is stored in the address translation unit in a mapping array coupled to a miss fetch unit. The mapping array is indexed by a unique command identifier (CI) for the memory fetch request. The address translation cache miss occurs due to a segment table cache miss or a page table cache miss. The memory fetch request is sent to get a page table entry or a segment table entry depending on the type of cache miss. Additional information stored with the CBI in the mapping array includes the fetch type (segment or page table fetch), a segment table cache set used for indexing into the cache, a page table cache set used for indexing into the cache, and an input/output identification (IOID).

In accordance with features of the invention, the command processing unit stops issuing address translation requests when a virtual channel has a predefined number of outstanding address translation requests. This prevents all miss fetch resources from being consumed by a single virtual channel.

In accordance with features of the invention, a limit on the number of cache misses for a single congruence class prevents over-allocating a cache set for a congruence class. When a congruence class is fully allocated to outstanding misses, an additional miss to that congruence class will be denied and the command processing unit will re-issue that miss at a later time. Other conditions exist that force the command processing unit to re-issue or stall translation requests that have translation cache misses. Examples are subsequent misses with the same IOID, VC and IO Bus as a previous miss that is in process. Also, commands that hit under a cache miss may or may not be allowed to continue depending on the storage ordering (SO) bits found in the page table entry (PTE). These bits dictate the ordering rules for commands using that PTE.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a problem solved is that of handling concurrent misses to a translation cache, keeping track of miss correspondence to memory fetch data, while allowing hits under those misses as well as preventing a single VC from consuming all miss fetch resources. A method is provided for handling concurrent address translation cache misses and hits under those misses while maintaining command order when required. Commands must be performed in order if they are from the same I/O bus, same virtual channel or same I/O device, and if the page table storage ordering bits indicate strict ordering. The invention also accommodates concurrent hardware and software loading the cache.

In accordance with features of the invention, an I/O command queue and translation cache structure are provided that allows concurrent cache misses and hits under those misses without allowing a single virtual channel to consume all of the miss fetch resources. There is a predefined limit to the number of cache misses for a single VC which, when reached, stalls the traffic for the VC. The command processing unit and the translation unit both need to be aware of this predefined limit.

In accordance with features of the invention, for an M-way segment table cache and an N-way page table cache, either a congruence class of the segment table cache can have M misses or a page table cache can have N misses at which point all translation requests are denied and re-issued. For example with a 4 way segment cache and an 8 way page cache with 8 outstanding misses to set 25 of the page table cache and 0 outstanding misses to the segment table cache would result in a stall where no additional commands will be accepted by the address translation unit until at least one of the current outstanding misses complete.

When there is a miss, subsequent translations that hit in the cache can proceed and complete if the accesses came from a different I/O bus, a different virtual channel or a different I/O device or if the page table storage ordering bits indicate that the accesses need not be in strict order.

Figure 1A:
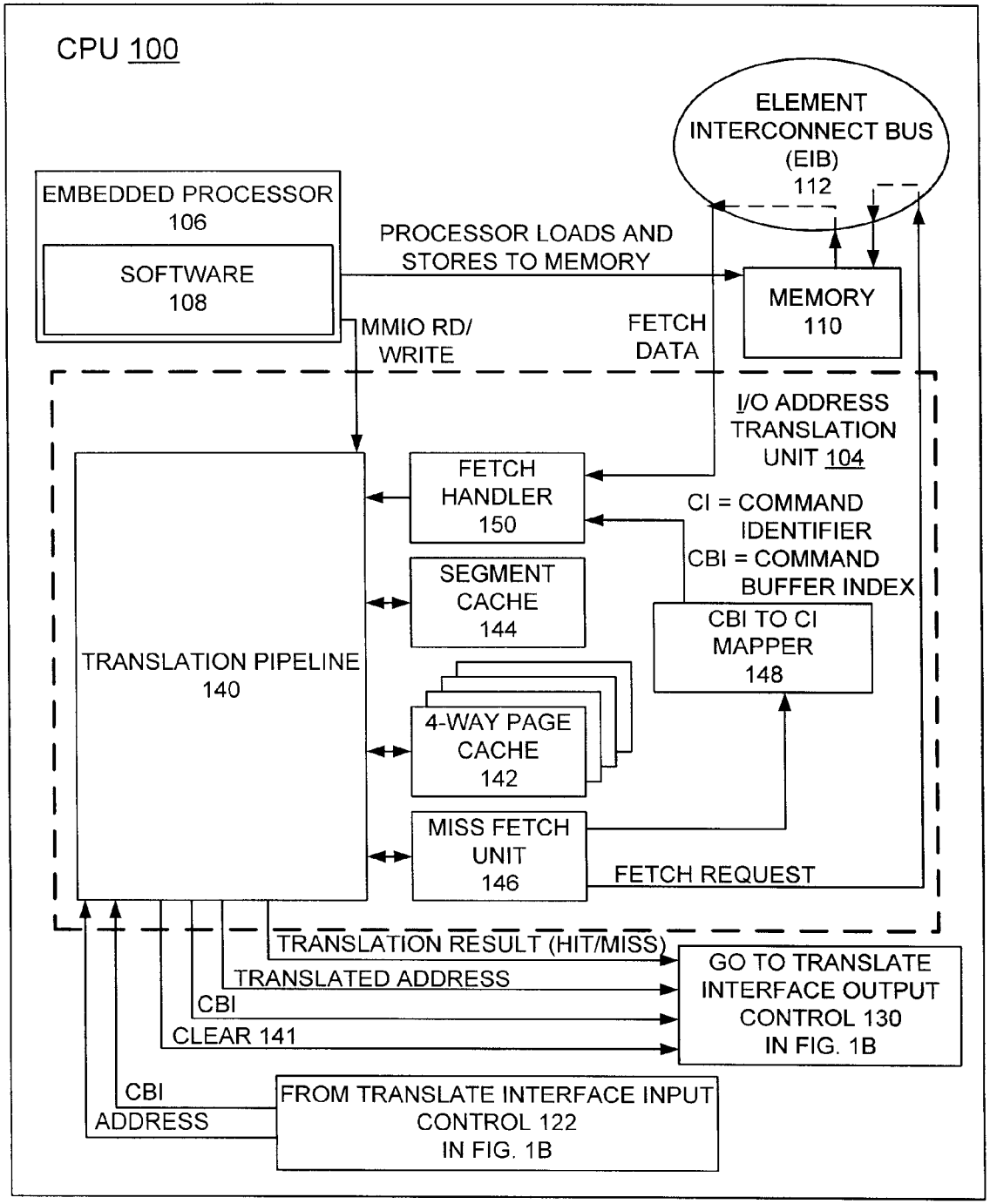
FIGS. 1A and 1B together illustrate apparatus for handling concurrent address translation cache misses and hits under those misses while maintaining command order based upon virtual channel in accordance with the preferred embodiment.
Figure 1B:
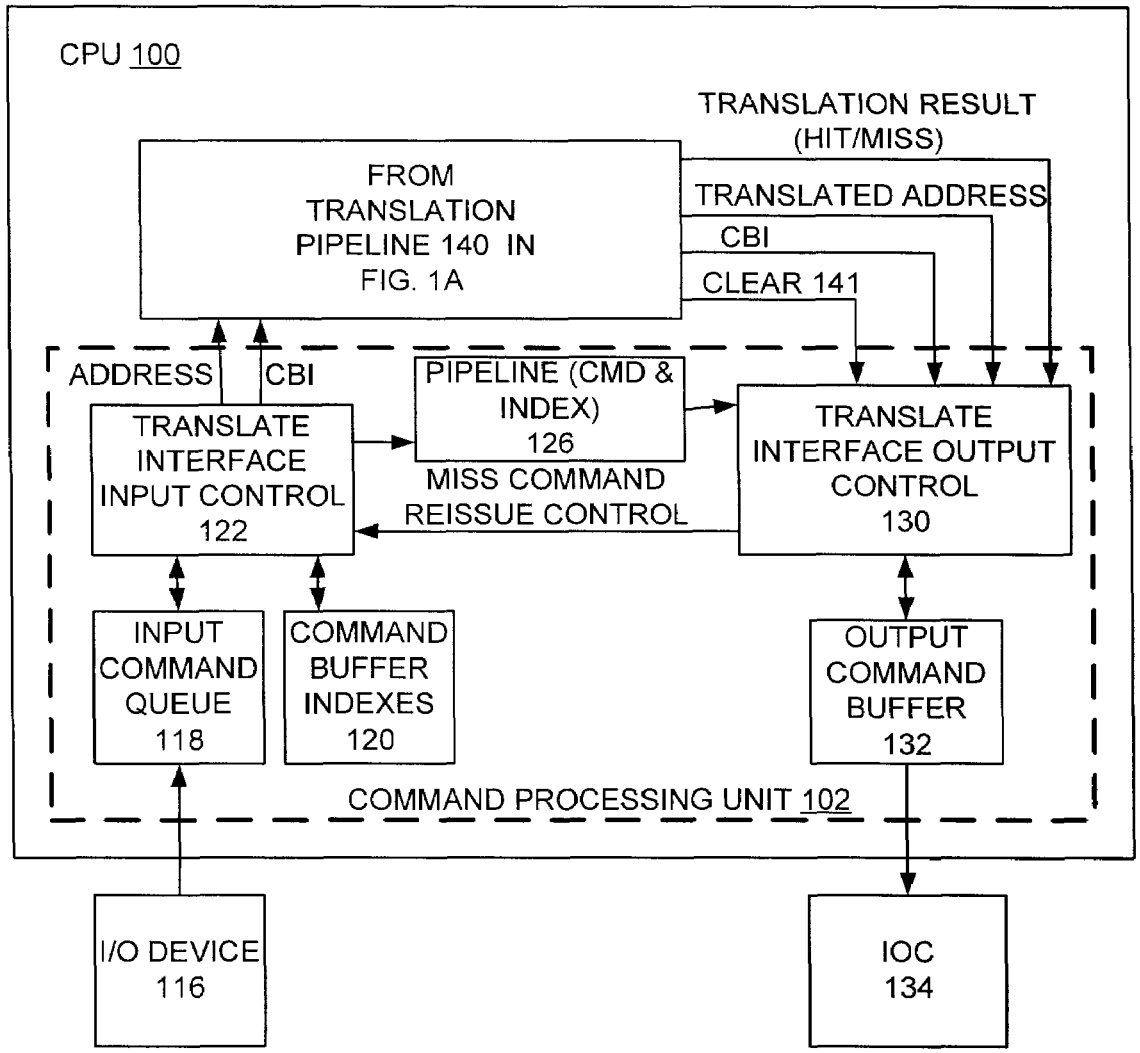

Having reference now to the drawings, in FIGS. 1A and 1B, there is shown an apparatus for handling concurrent address translation cache misses and hits under those misses while maintaining command order based upon virtual channel or a central processor unit (CPU) generally designated by the reference 100 in accordance with the preferred embodiment. CPU 100 includes a command processing unit generally designated by the reference 102 shown in FIG. 1B; and an I/O address translation unit generally designated by the reference 104, an embedded processor 106 together with software 108, a memory 110, and an Element Interconnect Bus (EIB) 112 shown in FIG. 1A.

Addresses for commands are passed from the command processing unit 102 to the I/O address translation unit 104 in the order that the commands are sent from an IO device 116. This ordering is assumed to be strict ordering because the ordering rules for the command, have not been read from the page table entry yet.

Referring to FIG. 1B, command processing unit 102 includes an input command queue 118 and a command buffer index function 120. The input command queue 118 maintains ordering of the commands from the IO device 116. The command buffer index function 120 assigns a command buffer index (CBI) for each address of the commands to be sent to the I/O address translation unit 104 in FIG. 1A.

Command processing unit 102 includes a translate interface input control 122 coupled to the input command queue 118 and the command buffer index function 120 of the preferred embodiment. The translate interface input control 122 provides an address and a command buffer index (CBI) for the address to a translation pipeline 140 of the I/O address translation unit 104 in FIG. 1A. The translate interface input control 122 provides the address and command buffer index (CBI) to a pipeline 126 coupled to a translate interface output control 130. Command processing unit 102 includes the translate interface output control 130 coupled between the address and CBI pipeline 126 and an output command buffer 132. Output command buffer 132 is coupled to an IOC 134. The I/O address translation unit 104 provides the translate interface output control 130 with a hit or miss translation result, a translated address, the CBI, and a CLEAR 141 signal to indicate that a fetch request for a cache miss has completed when a cache table entry is loaded into the cache. The translate interface output control 130 provides a miss command reissue control signal to the translate interface input control 122.

In the preferred embodiment the Input Command Queue 118 is a circular buffer with a single head pointer, a speculative tail pointer and a main tail pointer. Commands are added to the queue at the head and are removed from the queue at the main tail pointer. If translation is stalled for all virtual channels, no commands are sent to be translated. Otherwise, the command pointed to by the speculative tail pointer is sent to the I/O address translation unit to be translated and then the speculative tail pointer is advanced towards the head pointer. However, if translation is stalled for a specific virtual channel corresponding to the command pointed to by the speculative tail pointer, this command is not sent to the I/O address translation unit, but the speculative tail pointer is still advanced towards the head pointer. In addition to this circular buffer there is a list of completion flags, one per queue entry, which indicate that the command at that entry has completed address translation. When a command completes address translation successfully, and the main tail pointer is pointing to that command, the main tail pointer is advanced toward the head pointer to the next command that has not completed translation (i.e. the completion flag is not asserted). All completion flags, for completed commands that get bypassed, are then de-asserted. When a command completes address translation successfully and the command is between the main tail pointer and the head pointer in the command queue, then the completion flag for that entry is asserted. When a command gets a cache miss, the completion flag remains de-asserted. When the CLEAR 141 signal is asserted, the speculative tail pointer is set to the CBI value sent with the CLEAR 141 signal and then advances toward the head pointer re-issuing requests for the commands that have not completed translation. Other implementations are available such as the use of linked lists and separate command queues for each virtual channel.

As the addresses are passed from the command processing unit 102, two types of address translation misses can occur including a segment table cache miss and a page table cache miss. When a translation cache miss occurs the I/O address translation unit 104 performs a memory fetch to get the page or segment table entry depending on the type of the cache miss. Since this logic is pipelined, addresses are presented to the translation logic continually, so even when a cache miss occurs, addresses following that miss still are processed.

Referring to FIG. 1A, I/O address translation unit 104 includes a translation pipeline 140 providing a plurality of signals to the translate interface output control 130 in FIG. 1B, including translation results (hit/miss), a translated address, a command buffer index (CBI), and a CLEAR 141, which indicates to the command processing unit 102 that it should re-issue a translation request for a given command indexed by a CBI. The translation pipeline 140 is coupled to the EIB bus 124, a page cache 142, such as a 4-way page cache, a segment cache 144, and a miss fetch unit 146. The miss fetch unit 146 is coupled to mapping function which maps a command buffer index (CBI) to a command identifier (CI) referenced by CBI to CI mapper 148 which passes the CBI on a cache miss to the CBI to CI mapper 148. The miss fetch unit 146 applies a fetch request to the memory 110 via the EIB 112. A fetch data handler 150 is coupled to the CBI to CI mapper 148 and receives fetch data from memory 110 via the EIB 112.

The invention provides a method of implementing a miss-under-miss for I/O commands. Addresses that get cache hits during an outstanding miss are called hits-under-miss. When a miss occurs while another miss is being handled this is called a miss-under-miss. The process of the invention is as follows:

Initially every address from the translate interface input control 122 that is sent to the address translation unit 104 is assigned a Command Buffer Index (CBI) by command buffer index function 120 of the command processing unit 102. The CBI is the location of the command in the command processing unit's buffer or input command queue 118. This CBI is used when the entry for that miss has been loaded into the cache 142 and the commands address needs to be re-issued to the I/O address translation unit 104.

The command processing unit 102 sends an address and CBI from the translate interface input control 122 to the translation pipeline 140 of the I/O address translation unit 104. The segment table cache 144 is searched for the corresponding segment table entry, and the page table cache 142 is searched for the corresponding page table entry.

When an address translation cache miss occurs, a memory fetch request is sent by miss fetch unit 146 to the memory controller or memory 110 via the EIB 112. These memory fetches have unique identifiers so that when the return data comes back, the unit that sent the request accepts the data based on a return tag match. This unique Identifier is called the CI or command identifier. The CBI is stored in a mapping array 148 which is indexed by the CI so that when the return data comes back from memory 110, the translation logic or fetch handler 150 knows where to put the data and also can send back the CBI to the command processing 102 so that the command can be re-issued.

As the address translation cache 142, 144 gets cache misses, the memory fetch requests are sent out to the memory controller even though more than one memory fetch request is outstanding. The only stipulation is that when the address translation cache 142, 144 sees that a congruence class has as many outstanding misses as there are ways in the respective cache, the address translation cache 142, 144 indicates to the translate interface input control 122 of command processing unit 102 that the translation request was denied and that the command will need to be re-issued because all of the resources for a congruence class may be consumed.

Along with the CBI, additional translation information needs to be stored in the CBI to CI Mapping array 148 to help address translation 104 update the cache. This additional information is the following: the fetch type (segment or page table fetch); Segment Table Cache Set, which is used for indexing into the cache 144; Page Table Cache Set, which is used for indexing into the cache 142; and IOID or the identification of a particular I/O device 116.

Once the page table or segment entry has been loaded into the appropriate cache 142 or 144, the CBI is passed back to the translate interface output control 130 of command processing unit 102 with a CLEAR 141 signal to indicate that the fetch has completed and that it can re-issue the address translation request because the cache entry has been loaded.

The command processing unit 102 then uses the CBI to locate the command and address that needs to be re-issued to the I/O address translation unit 104.

When the address together with the CBI is re-issued to the translation unit 104, a cache hit should result in the appropriate cache 142 or 144 that had the previous cache miss. The hits under a miss to the same VC, IOID or I/O bus are re-translated after the miss is translated. Other, more elaborate schemes, could track and not re-issue the commands that have completed translation and are already stored in the output command buffer 132.

While the present invention has been described with reference to the details of the embodiments of the invention shown in the drawing, these details are not intended to limit the scope of the invention as claimed in the appended claims.

What is claimed is:

1. A method for handling concurrent address translation cache misses and hits under those misses while maintaining command order comprising the steps of:

storing commands and maintaining ordering of the commands in a command processing unit;

assigning a command buffer index (CBI) to each address being sent from said command processing unit to an address translation unit;

issuing said address and said CBI to said address translation unit for each address translation request;

sending a first memory fetch request when a first address translation cache miss occurs in said address translation unit;

sending another memory fetch request when another cache miss occurs while the first memory fetch request for the first address translation cache miss is outstanding;

said command processing unit, responsive to a predefined number of outstanding address translation misses for a virtual channel, stops issuing address translation requests to said address translation unit for said virtual channel;

said address translation unit, responsive to each memory fetch request being completed, sending the CBI with a signal to said command processing unit to indicate each respective memory fetch request has completed;

said command processing unit, responsive to the CBI with said signal, using the CBI to locate the command and address in said command processing unit to reissue the address translation request for the previous address translation cache miss, to said address translation unit; and said command processing unit, responsive to reissuing the address translation request for a previous address translation cache miss, reissues address translation requests to said address translation unit for hits under a previous address translation cache miss with a same virtual channel, I/O Bus and I/O device.

2. The method for handling concurrent address translation cache misses as recited in claim 1 further includes storing said CBI in a mapping array in said address translation unit; said mapping array being indexed by a unique command identifier (CI) for each respective memory fetch request.

3. The method for handling concurrent address translation cache misses as recited in claim 1 wherein each respective memory fetch request is completed when a cache table entry is loaded into an address translation cache in said address translation unit.

4. The method for handling concurrent address translation cache misses as recited in claim 1 wherein said command processing unit continues issuing address translation requests to said address translation unit for commands from a different input/output bus.

5. The method for handling concurrent address translation cache misses as recited in claim 1 wherein said command processing unit continues issuing address translation requests to said address translation unit for commands from a different virtual channel.

6. The method for handling concurrent address translation cache misses as recited in claim 1 wherein said command processing unit continues issuing address translation requests to said address translation unit for commands from a different input/output device.

* * * * *